July 9, 1963     O. E. FARRAND     3,096,853
SIMPLIFIED DISC BRAKE AND AUTOMOTIVE VEHICLE
Filed June 1, 1961
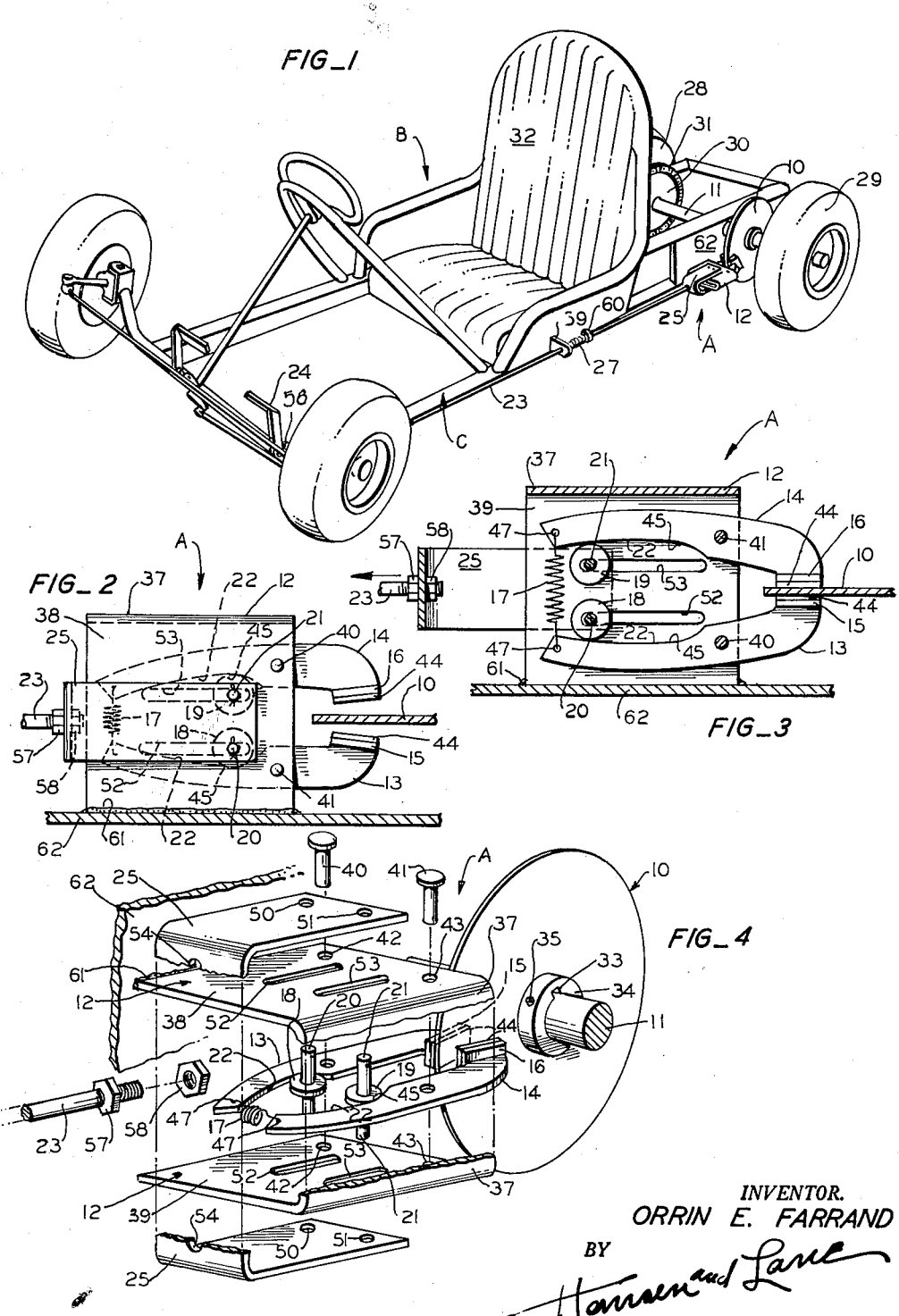
INVENTOR.
ORRIN E. FARRAND
BY
Harrison and Lane
ATTORNEYS

3,096,853
SIMPLIFIED DISC BRAKE AND AUTOMOTIVE VEHICLE

Orrin E. Farrand, San Jose, Calif., assignor to Michael O. Farrand, San Jose, Calif.
Filed June 1, 1961, Ser. No. 114,049
3 Claims. (Cl. 188—18)

The present invention relates to a brake, and pertains more particularly to a brake which is particularly adapted for use on a small, automotive vehicle of the type commonly known in the industry as a "kart."

These "karts" originated as children's toys, but have had a rapidly increasing use, not only as toys for children, but also as low cost, owner-driven race cars for adults. For the latter use relatively powerful engines have been provided, and the "karts" attain substantial speeds, frequently in excess of 60 miles per hour.

An object of the present invention is to provide a rugged disc brake of high effectiveness but of utmost simplicity and low cost.

Another object of the invention is to provide an improved and simplified disc brake for mounting adjacent a driven axle of a drive wheel of an automotive vehicle.

A further object is to provide a simple and effective brake on an automotive vehicle of the general type referred to herein.

These, and other objects and advantages of the invention, will be apparent from the following description and the accompanying drawings wherein:

FIG. 1 is a perspective view of an automotive vehicle equipped with a disc brake embodying the present invention.

FIG. 2 is an enlarged, horizontal, top plan view of the brake mechanism shown in FIG. 1, concealed portions thereof being shown in broken lines, and fragments of a chassis member and brake disc being shown in section, the brake being shown in its normal, released condition.

FIG. 3 is a similarly enlarged horizontal sectional view through the brake mechanism of FIGS. 1 and 2 taken along a plane just above the brake arms, the brake being shown in its actuated, braking condition.

FIG. 4 is an exploded, perspective view of the brake structure of FIGS. 2 and 3, the housing and yoke thereof being broken apart and the parts thereof separated to disclose more clearly the structure and relative positions of the various portions of the mechanism.

Briefly, the illustrated form of the invention comprises a brake mechanism A mounted on a small automotive vehicle B with a metal brake disc 10 secured co-axially to the engine-driven rear axle 11 of the vehicle. The brake mechanism A comprises U-shaped housing 12 secured to the vehicle chassis C just ahead of the brake disc 10. A pair of brake arms 13 and 14 are pivotally mounted in the brake housing 12, and are provided with integral, inwardly facing brake jaws 15 and 16, respectively, on the rearward ends thereof.

The forward ends of the brake arms 13 and 14 are interconnected by a tensioned coil spring 17 which urges the brake arms toward their disc-releasing position of FIG. 2. Brake actuating rollers 18 and 19 are journaled on pins 20 and 21 mounted in an actuating yoke 25, and ride along the similarly curved inner edges 22 of the brake arms 13 and 14 for actuating the brake A.

A brake actuating rod 23, operated by a brake pedal 24, is connected to an actuating yoke 25, and is urged rearwardly toward its brake releasing position of FIG. 2 by a coil compression spring 27. When the brake pedal 24 is depressed the yoke 25 is drawn forwardly to move the rollers 18 and 19 forwardly along the curved inner edges 22 of the brake arms 13 and 14, thereby swinging the latter in opposite directions toward their disc gripping condition of FIG. 3.

Referring to the drawings in greater detail, the rear axle 11 of the vehicle B upon which the brake mechanism A is to be mounted is preferably a solid shaft extending entirely through to both rear wheels 28 and 29 of the vehicle and is secured in driving relation with at least one of said rear wheels. A chain sprocket 30 is mounted on the rear axle 11 to rotate therewith. A drive chain 31 of conventional roller type is passed around the sprocket 30 and is driven by a small, air-cooled, internal combustion engine, not shown, of the well known type employed on power lawn mowers. The engine is mounted behind the driver's seat back 32 and is concealed thereby in the illustration of FIG. 1.

The brake disc 10, which may be of suitable metal, such as steel, is also secured to the rear axle 11 for rotation therewith, but free for slidable adjustment thereon, for example by a conventional Woodruff key, not shown, seated in a keyway 33 in a hub portion 34 integral with the disc 10. The disc 10 is also secured by a set screw 35 in axially adjusted, centered position between the brake jaws 15 and 16 when the brake assembly A is mounted on the chassis C as shown in FIGS. 1–3.

The U-shaped brake housing 12 is formed by reversely bending a flat strip of suitable plate material, such as, for example, ⅛ inch thick steel plate, medially of its length at 37 so that the two flat side legs 38 and 39 thereof are parallel, and are spaced apart a sufficient distance to receive the brake arms 13 and 14 for free pivotal movement therebetween.

The brake arms 13 and 14 are similar to each other, and are inserted between the housing legs 38 and 39 in relatively reversed position. The brake arms 13 and 14 are pivotally mounted on pivot pins 40 and 41 which are inserted through aligned pairs of holes 42 and 43 provided therefor in opposite legs of the housing 12. The brake arms 13 and 14 project rearwardly beyond the housing 12, and the rearwardly projecting portions thereof have the jaws 15 and 16 formed integrally thereon. The brake jaws 15 and 16 are faced on their inner sides with blocks 44 of suitable brake lining material.

The brake arms 13 and 14 also extend forwardly from their respective pivot pins 40 and 41 within the housing 12, and the inner edges 22 of the forwardly extending portions thereof are curved gradually inwardly from low points 45 forwardly, and more sharply inwardly from said low points 45 rearwardly. A spring receiving hole 47 is provided in the forward end of each brake arm 13 and 14, and the coil spring 17 has its ends hooked into these holes and is held in tension between the forward ends of said brake arms, thereby urging said brake arms toward their disc releasing condition of FIG. 2.

The support pins 20 and 21 for the brake actuating rollers 18 and 19 are inserted in aligned pairs of holes 50 and 51 provided therefor in the upper and lower legs of the yoke 25. The latter, like the housing 12, is of U-shape and is formed in a similar manner, but with its legs spaced apart to fit slidably over the housing 12. Upon movement of the yoke 25 between its released, rearward position of FIG. 2 and its actuated, forward position of FIG. 3, the roller support pins 20 and 21 ride in aligned pairs of slotted holes 52 and 53 provided therefor in the upper and lower legs of the U-shaped housing 12.

The brake actuating rod 23 is inserted in a hole 54 provided therefor in the forward end of the yoke 25, and is secured therein by a pair of nuts 57 and 58 threaded onto the rod 23 and gripping the forward end of the yoke therebetween as best shown in FIG. 3. The forward end of the brake rod 23 is pivotally connected in a conventional manner at 56 to the brake actuating pedal 24, which, upon depression by a driver of the vehicle B, moves the rod 23 forwardly toward its actuated position in FIG. 3.

The retracting spring 27 encircles the rod 23 and is held in compression between a guide bracket 59 secured to the side of the chassis C and a collar 60 secured in adjusted position on the brake rod. The spring 27 urges the brake rod rearwardly, thereby urging the yoke 25 and the rollers 18 and 19 carried thereby toward their rearward, brake releasing condition of FIG. 2. The tension of the brake arm interconnecting spring 17, and the length and compressive strength of the brake actuating rod return spring 27, are such as to cause the rollers 18 and 19 to ride approximately at low points 45 of the curved inner edges 22 of the brake arms 13 and 14 when the brake pedal 24 is released.

In mounting a brake A on a vehicle B the brake housing 12 is first secured, as by welding 61, to a suitable, fixed, chassis element, such as the plate 62. The brake disc 10 is mounted on the axle 11 having a drive wheel 29 secured thereto between the brake jaws 15 and 16 and free for axial adjustment on the axle. The yoke 25 is then moved forwardly to move the brake actuating rollers 18 and 19 forwardly along the curved inner edges 22 of the brake arms 13 and 14, thereby urging the brake jaws 15 and 16 together as shown in FIG. 3 to grip the brake disc 10 firmly therebetween. This action centers the brake disc 10 properly between the brake jaws 15 and 16. The disc 10 is then secured to the axle 11 in this adjustment positioned as by means of the set screw 35.

The brake actuating rod 23 is then attached to the yoke 25 and to the brake pedal 24, and the collar 60 is secured in properly adjusted position on the brake rod 23 to permit the rollers 18 and 19 to ride in the low points 45 of the curved brake arm edges 22 when the brake pedal 24 is released.

Upon depressing the brake pedal 24 the brake rod 23 moves the yoke 25, with the rollers 18 and 19 mounted therein, forwardly. The rollers roll forwardly along the curved inner edges 22 of the brake arms 13 and 14 from swing the brake arms 13 and 14 to their disc gripping position of FIG. 3. Upon releasing the brake pedal 24 the coil retraction spring 27 urges the rod 23, yoke 25 and rollers 18 and 19 toward their respective positions of FIG. 2, whereupon the brake arm interconnecting spring 17 urges the jaws toward their normal, disc releasing condition of FIG. 2.

The invention provides a simple, inexpensive disc brake, which is easily mounted on a vehicle axle having a support wheel secured thereto, and which lends itself to positive, inexpensive operation and maintenance when mounted on such a vehicle.

While I have illustrated and described a preferred embodiment of the present invention, it will be understood, however, that various changes and modifications may be made in the details thereof without departing from the scope of the invention as set forth in the appended claims.

Having thus described the invention, what I claim as new and desire to protect by Letters Patent is defined in the following claims:

1. A disc brake mechanism for a small automotive vehicle of the "kart" type having a frame, an axle journaled on the frame and secured co-axially to a support wheel mounted thereon; said brake mechanism comprising a strong, metal braking disc secured co-axially to the axle and spaced axially thereof from the frame, a U-shaped brake housing of metal plate material welded along its ends to the frame and with an open side thereof radially adjacent an edge of the disc, a pair of brake lever arms mounted interiorly of the housing and pivotally connected thereto, an end portion of each brake arm extending beyond the housing and over a marginal portion of the disc, a brake block secured to the extending end portion of each brake arm and facing an opposite side of the disc from the other, said brake arms being pivotally movable to swing the brake blocks into and out of engagement with opposite sides of the disc, spring means pivotally urging the brake arms in directions to separate the brake blocks from the disc, a cam face on each brake arm, a pair of cam follower rollers mounted in the housing and in rolling engagement with the cam faces on the brake arms, a co-axial shaft portion on each cam follower roller riding in guided relation in a longitudinally slotted opening provided therefor in the housing, and means operatively engaging said shaft portions for moving the cam follower rollers in rolling engagement along the cam faces of the brake arms to thereby pivotally urge the brake arms in directions to move the brake blocks thereon into braking engagement with opposite sides of the disc.

2. A disc brake mechanism for a small automotive vehicle of the "kart" type having a frame, and an axle journaled on the frame and secured co-axially to a support wheel mounted thereon; said brake mechanism comprising a strong, metal braking disc secured co-axially to the axle and spaced axially thereof from the frame, a U-shaped brake housing of metal plate material welded along its ends to the frame and with an open side thereof radially adjacent an edge of the disc, the sides of the housing being parallel and spaced apart to receive a pair of brake arms in guided relation therebetween, a pair of brake lever arms mounted in guided relation between the sides of the housing and pivotally connected thereto, an end portion of each brake arm extending beyond the housing and over a marginal portion of the disc, a brake block secured to the extending end portion of each brake arm and facing an opposite side of the disc from the other, said brake arms being pivotally movable to swing the brake blocks into and out of engagement with opposite sides of the disc, spring means pivotally urging the brake arms in directions to separate the brake blocks from the disc, an edge of each brake arm formed to define a cam face, a pair of cam follower rollers mounted in guided relation between the sides of the housing and in rolling engagement, one with the cam face on each brake arm, a co-axial shaft portion on each cam follower roller riding in guided relation in a longitudinally slotted opening provided therefor in the housing, a second U-shaped actuating member of metal strap material slidably mounted to receive the housing between the two legs thereof, the shaft portions of said rollers being mounted in holes provided therefor in the actuating member, and tension means connected to the actuating member and operable by a driver of the vehicle for moving the cam follower rollers in guided, rolling engagement along the cam faces of the brake arms to thereby pivotally urge the brake arms in directions to move the brake blocks thereon into braking engagement with opposite sides of the disc.

3. A disc brake mechanism for a small automotive vehicle of the "kart" type having a frame, an axle journaled on the frame and secured co-axially to a support wheel mounted thereon; said brake mechanism comprising a strong, metal braking disc secured co-axially to the axle and spaced axially thereof from the frame, a brake housing comprising a U-shaped metal plate reversely folded along a medial portion with the sides thereof flat, parallel, and spaced apart to receive a pair of brake arms in guided, side-by-side relation therebetween, said housing being welded along the open ends of the sides thereof to the frame adjacent an edge of the disc, a pair of brake lever arms pivotally mounted in side-by-side, guided relation between the sides of the housing and with end portions of the brake arms extending through an open side of the housing and into overlapping relation with opposite sides of the disc, a brake block secured to the extending end portion of each brake arm and facing an opposite side of the disc from the other, said brake arms being pivotally movable in opposite rotative directions to swing the brake blocks into and out of engagement with opposite sides of the disc, a tensioned coil spring interconnecting the opposite ends of the arms from the brake blocks to urge the latter away from the disc, a cam face along the inner edge of each brake arm, a cam follower roller riding in guided relation in each of two slotted guide openings provided therefor in the sides of said housing and in rolling relation with each cam face, a U-shaped yoke slidably fitted over the U-shaped housing and at right angles thereto, and operatively connected to both of said rollers for moving the latter in union with said yoke in guided, rolling engagement along the cam faces of the brake arms to thereby pivotally urge the brake arms in directions to move the brake blocks thereon into braking engagement with opposite sides of the disc, and a power multiplying member connected in tension with said U-shaped yoke and mounted on the vehicle within reach of a driver's foot.

References Cited in the file of this patent

UNITED STATES PATENTS

| | | |
|---|---|---|
| 526,317 | Hendrick et al. | Sept. 18, 1894 |

FOREIGN PATENTS

| | | |
|---|---|---|
| 785,248 | France | May 14, 1952 |
| 1,237,699 | France | June 20, 1960 |